US010716124B1

(12) United States Patent
Marupaduga et al.

(10) Patent No.: US 10,716,124 B1
(45) Date of Patent: Jul. 14, 2020

(54) USE OF EUCLIDIAN DISTANCE BETWEEN UES AS BASIS TO CONTROL GROUPING FOR MU-MIMO SERVICE

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/209,052

(22) Filed: Dec. 4, 2018

(51) Int. Cl.
| | |
|---|---|
| *H04W 72/12* | (2009.01) |
| *H04B 17/336* | (2015.01) |
| *H04W 4/08* | (2009.01) |
| *H04W 64/00* | (2009.01) |
| *H04W 4/02* | (2018.01) |
| *H04W 28/26* | (2009.01) |
| *H04B 7/0452* | (2017.01) |
| *H04W 72/04* | (2009.01) |

(52) U.S. Cl.
CPC ........ *H04W 72/121* (2013.01); *H04B 7/0452* (2013.01); *H04B 17/336* (2015.01); *H04W 4/023* (2013.01); *H04W 4/08* (2013.01); *H04W 28/26* (2013.01); *H04W 64/003* (2013.01); *H04W 72/0453* (2013.01)

(58) Field of Classification Search
CPC ..... H04W 71/121; H04W 4/023; H04W 4/08; H04W 28/26; H04W 64/003; H04W 72/0453; H04B 17/336; H04B 7/0452
See application file for complete search history.

(56) References Cited

U.S. PATENT DOCUMENTS

| | | | |
|---|---|---|---|
| 2006/0274776 A1* | 12/2006 | Malik | H04B 7/00 370/445 |
| 2011/0230224 A1* | 9/2011 | Larsson | H04W 72/082 455/513 |
| 2012/0315938 A1 | 12/2012 | Van Nee et al. | |
| 2013/0064213 A1* | 3/2013 | Park | H04W 76/14 370/329 |
| 2016/0037550 A1* | 2/2016 | Barabell | H04W 72/1263 455/450 |
| 2016/0338099 A1* | 11/2016 | Serizawa | H04W 74/04 |

* cited by examiner

*Primary Examiner* — Stephen J Clawson (57) ABSTRACT

A base station will group UEs together for MU-MIMO service with the grouping being based at least in part on the UEs of the group being at least a threshold Euclidian distance from each other. Further, the base station could dynamically set the threshold Euclidian distance based on consideration of coverage quality. And the base station could additionally base the UE grouping on the UEs of the group having threshold angular separation, having reported threshold high SINR, and/or on one or more other factors.

18 Claims, 5 Drawing Sheets

USE OF EUCLIDIAN DISTANCE BETWEEN UES AS BASIS TO CONTROL GROUPING FOR MU-MIMO SERVICE

BACKGROUND

A wireless communication system typically includes a number of base stations that are configured to provide wireless coverage areas, such as cells and cell sectors, in which user equipment devices (UEs) such as cell phones, tablet computers, tracking devices, embedded wireless modules, and other wirelessly equipped communication devices (whether or not user operated), can operate. In turn, each base station could be coupled with network infrastructure that provides connectivity with one or more transport networks, such as the public switched telephone network (PSTN) and/or the Internet for instance. With this arrangement, a UE within coverage of the system could engage in air interface communication with a base station and could thereby communicate via the base station with various remote network entities or with other UEs served by the base station.

Each coverage area in such a system could operate in accordance with a particular radio access technology, with air-interface communications from the base stations to UEs defining a downlink or forward link and air-interface communications from the UEs to the base stations defining an uplink or reverse link.

Over the years, the industry has embraced various "generations" of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance with the radio access technology, each coverage area could operate on a carrier, which could be frequency division duplex (FDD), defining separate frequency channels for downlink and uplink communication, or time division duplex (TDD), with a single frequency channel multiplexed over time between downlink and uplink use. Further, on the downlink and uplink, the carrier could be structured to define various physical channels for carrying information between the base stations and UEs. For example, the air interface could be divided over time into frames, each divided in turn into subframes and timeslots, and the carrier bandwidth could be divided over frequency into subcarriers, which could be grouped within each timeslot to define physical resource blocks (PRBs) in which the subcarriers can be modulated to carry data.

The base station could then be configured to coordinate use of these air-interface resources on an as-needed basis. For example, when the base station has data to transmit to a UE, the base station could allocate particular downlink air-interface resources to carry that data and could accordingly transmit the data to the UE on the allocated downlink resources. And when a UE has data to transmit to the base station, the UE could transmit to the base station an uplink resource grant, the base station could responsively allocate particular uplink air-interface resources to carry the data, and the UE could then transmit the data to the base station on the allocated uplink resources.

Overview

One of the key performance metrics of a wireless communication system is its spectral efficiency, namely, the extent of data that the system can carry per unit of frequency spectrum. The spectral efficiency of a wireless communication system or its base stations could be measured as a quantity of bits per Hertz.

If a wireless communication system has low spectral efficiency, a provider of the system may need to configure the system with additional licensed spectrum, such as wider carriers and/or more carriers, in order to accommodate subscriber communication needs. However, adding licensed spectrum could be costly and therefore undesirable.

One way to help improve spectral efficiency is to make use of MIMO technology.

With MIMO, a base station can engage in air interface communication concurrently on multiple different radio-frequency (RF) propagation paths, or MIMO "layers," with multiple layers occupying the same frequency resources (e.g., subcarriers and PRBs) as each other. To facilitate this, the base station could be equipped with a MIMO antenna array, comprising multiple transmit antennas and multiple receive antennas. By suitably weighting and precoding transmissions by particular antennas in the array, the base station can then output spatially separate but concurrent transmissions for receipt by its served UEs. Because these concurrent transmissions occupy the same frequency resources (e.g., subcarriers) as each other, MIMO can thereby support a greater extent of data communication per unit frequency, thereby increasing the base stations' spectral efficiency and possibly avoiding or deferring the need to add more spectrum.

MIMO service could be used in a "single-user MIMO" (SU-MIMO) configuration to increase the data rate of transmission to a single UE, by multiplexing communications to the UE onto multiple separate layers using the same air-interface resources as each other. For instance, when a base station has data to transmit to a UE, the base station could time-division-multiplex the data into multiple data streams, the base station could modulate the data streams onto the same PRBs as each other, and the base station could output the modulated data streams onto separate antenna ports for concurrent transmission on separate respective propagation paths to the UE. In practice, the UE could have two or more antennas, and the UE could estimate the channel distortion at each of its antennas and use the estimates to separately compute and uncover each of the base station's transmit signals.

Further, MIMO can also be used in a "multi-user MIMO" (MU-MIMO) configuration to increase the data capacity of the air interface by allowing communications to multiple UEs to use the same air-interface resources as each other. For instance, a base station can modulate data streams destined to each of multiple UEs on the same PRBs as each other and can transmit the modulated data streams on a separate respective propagation paths for receipt by the UEs. To facilitate this, the base station could pre-code transmissions on each propagation path using weighted coefficients based on channel estimates from the UEs, in a manner that enables each UE to remove cross-talk and receive its intended data. Further, the base station could beamform the transmissions respectively to each UE to help physically distinguish the transmissions from each other. In theory, MU-MIMO could thus increase the data capacity of the air interface by allowing a base station to serve more UEs at a time without requiring additional air-interface resources.

In dense urban markets and other areas, wireless service providers may face a need to provide an increased extent of MIMO service. In particular, in such areas, a provider may serve a great many UEs or may otherwise need to support high aggregate throughput, but the provider may have limited available spectrum, such as a limited number of PRBs per timeslot. To help overcome that limitation, the provider may equip its base stations with a massive-MIMO antenna array.

While a traditional MIMO antenna array may include on the order of 2 to 8 antennas, a massive-MIMO antenna array would include many more antennas, perhaps on the order of tens, hundreds, or even thousands of antennas. For instance, a representative massive-MIMO antenna array could include 128 antennas, of which 64 might be configured as transmit antennas and the other 64 might be configured as receive antennas. With this arrangement, if 4 transmit antennas are used per layer (e.g., to facilitate beamforming), the massive-MIMO antenna array might support on the order of 16 layers, to facilitate concurrent transmissions to up to 16 UEs (e.g., 8 UEs with 2 layers apiece, or 16 UEs with 1 layer apiece) or transmission to a single UE with up to 16 layers, among other possibilities.

When a base station serves many UEs at once, the base station could beneficially apply MU-MIMO in order to provide concurrent high-throughput transmissions to the UEs. For example, if the base station's air interface has 100 PRBs per timeslot and the base station has a massive-MIMO array as discussed above, then, with MU-MIMO, the base station could theoretically transmit concurrently to 8 UEs with 2 layers apiece on all 100 of those PRBs. Within one timeslot, each UE could thus theoretically receive two times the single-layer data capacity of those 100 PRBs. (By comparison, if instead of applying MU-MIMO, the base station were to apply just SU-MIMO with 2 layers apiece for each of those 8 UEs, then the base station might transmit to each UE with 2 layers on just about 12 PRBs, thus not providing as much of a throughput increase.)

To facilitate MU-MIMO service, the UEs that will share air-interface resources (e.g., PRBs) should be "orthogonal" to each other, meaning that each UE could receive spatially separate transmissions from the base station without undue interference from the base station's transmissions to each other UE. Thus, when a base station is going to apply MU-MIMO service (perhaps in response to the base station being heavily loaded with connected UEs with high throughput requirements), the base station could select a group of UEs to be a MU-MIMO group based on the UEs being orthogonal to each other.

Considering that MU-MIMO involves transmission of spatially separate beams to the UEs of the MU-MIMO group, the base station could base its grouping of UEs on a determination that transmissions to the UEs of the group would have sufficient angular separation from each other. For instance, the base station could determine an angle of arrival of transmissions respectively from each of the base station's served UEs, and the base station could select UEs to group as a MU-MIMO group based on the selected UEs having threshold different angles of arrival than each other. Further, the base station could base the grouping of UEs on a determination that each UE of the group has reported threshold high quality coverage (e.g., strong receive power and/or signal-to-noise ratio)—as high quality coverage may make it easier for a UE to receive intended downlink transmissions.

Basing MU-MIMO grouping of UEs on the existence of threshold angular separation of the UEs is useful. But it may not account for the possibility that UEs are physically close enough together to pose an issue with interference between their intended beams. Angularly separated beams that originate from a common antenna array will be closer to each other at shorter distances from the antenna array and will be farther apart from each other at longer distances from the antenna array. Consequently, basing MU-MIMO grouping on the existence of threshold angular separation may not necessarily mean that the grouped UEs would be physically so far apart from each other that their intended beams would be unlikely to interfere. For instance, the UEs might be close to the base station's antenna array and their beams may therefore be relatively close to each other even the beams are deemed to have threshold angular separation.

Disclosed herein is a method and system to help address this issue.

In accordance with the disclosure, a base station will group UEs together for MU-MIMO service with the grouping being based at least in part on the UEs of the group being at least a threshold Euclidian distance from each other. Further, the base station could additionally condition the UE grouping on the UEs of the group having threshold angular separation, having reported threshold high SINR, and/or on one or more other factors.

In addition, as to the Euclidian-distance threshold, the base station could dynamically establish the threshold based on an evaluation of coverage quality experienced by the UEs at issue, on grounds that greater physical separation between a pair of UEs could help the UEs receive their intended beams when either or each UE is faced with lower quality coverage. For instance, for each potential pair of UEs to be grouped together for MU-MIMO service, the base station could determine which of the UEs has a worse reported coverage quality, and the base station could set the Euclidian distance threshold based on that reported coverage quality. If the reported coverage quality is relatively low, then the base station could set a relatively high Euclidian distance threshold. Whereas, if the reported coverage quality is relatively high, then the base station could set and apply a relatively low Euclidian distance threshold.

Accordingly, in one respect, disclosed is a method for controlling transmission over an air interface in a wireless communication system. According to the method, a base station serves a plurality of UEs over the air interface, and each UE is positioned at a respective geographic position. Further, as to two of the UEs, the base station determines whether to group the two UEs together with each other for MU-MIMO service, with the determination being based at least on whether a Euclidian distance between the two UEs' geographic positions is at least as great as a threshold Euclidian distance. And the base station may dynamically set the Euclidian-distance threshold based on evaluation of one or more RF noise levels.

If the base station thereby determines to group the UEs together for MU-MIMO service, then the base station could responsively group the UEs together for MU-MIMO service and could thus schedule communications to the UEs to occur on the same physical air interface resources (e.g., PRBs) as each other.

Whereas if the base station thereby determines to not group the UEs together for MU-MIMO service, then the base station would not group the UEs together for MU-MIMO service. Instead, in that case, the base station could schedule communications to each UE to occur on physical air interface resources (e.g., PRBs) on which the base station does not schedule communications to any other of the base station's served UEs. Or the base station might group either or each UE together with one or more other UEs for MU-MIMO service.

In an example implementation of this method, the base station could identify various candidate pairs of the base station's served UEs and, respectively for each pair, could determine based on a Euclidian distance between the geographic positions of the UEs of the pair, whether to group the UEs of the pair together for MU-MIMO service. The base station could thereby establish a MU-MIMO group including two or more UEs, based on the two or more UEs being threshold distant from each other.

Further, disclosed is a base station operable in a wireless communication system to control transmission over an air interface. In accordance with the disclosure, the base station includes an antenna structure comprising a plurality of antennas for communicating over the air interface, the air interface defining physical channel resources for carrying data wirelessly from the base station to a plurality of UEs served by the base station. Further, the base station includes a controller for scheduling use of the physical channel resources to carry data wirelessly from the base station to the UEs. Per the disclosure, the controller is configured to determine whether to group a subset of the UEs together for MU-MIMO service, with the determination being based at least on whether the UEs of the subset are separated from each other by at least a threshold Euclidian distance. And the controller is configured to cause the base station to operate in accordance with the determination.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, re-ordered, or otherwise modified. In addition, operations described as being performed by one or more entities could be implemented in various ways, such as by a processor executing instructions stored in non-transitory data storage, along with associated circuitry or other hardware, for instance.

Figure 1:
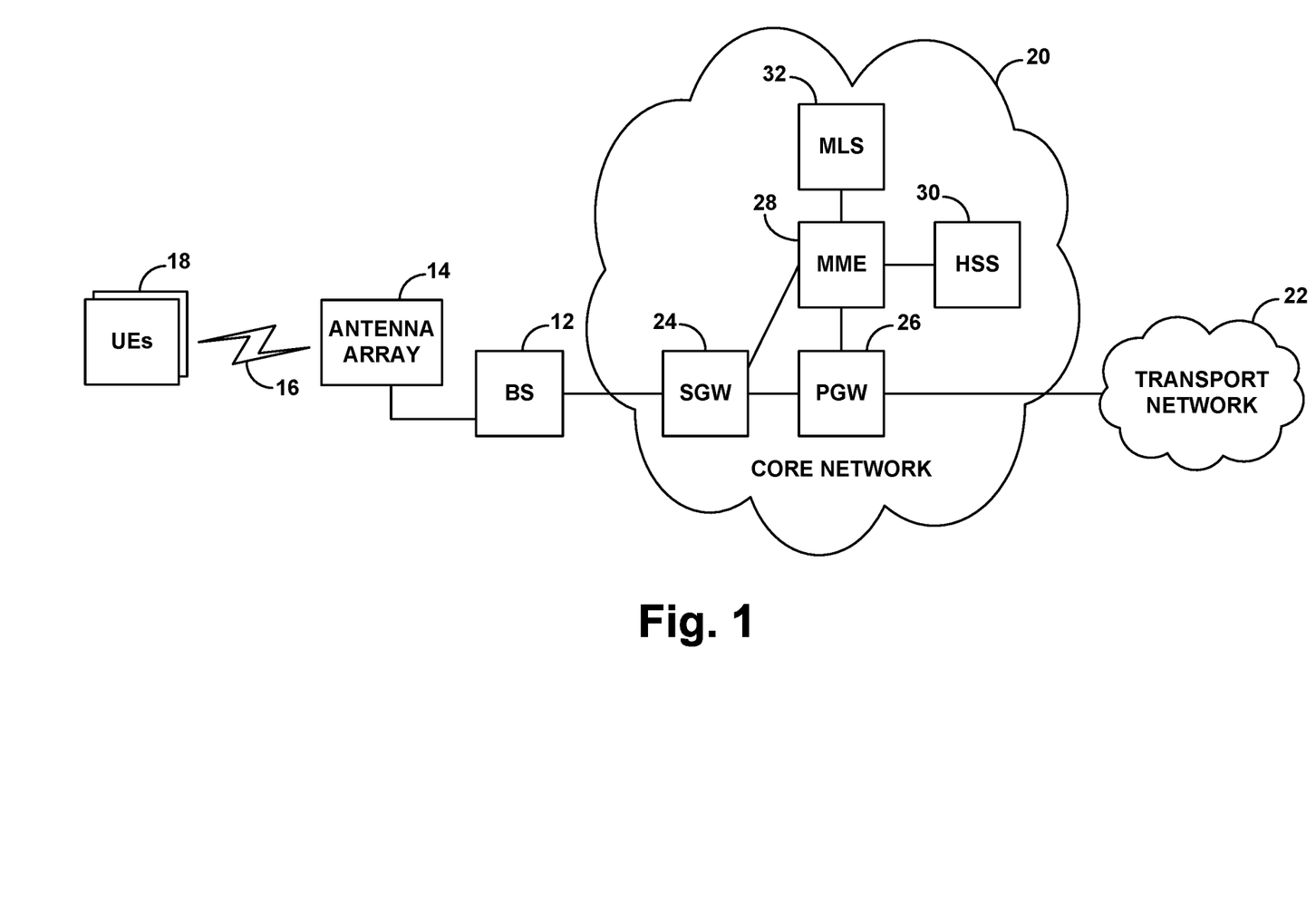
FIG. 1 is a simplified block diagram of a network arrangement in which aspects of the present disclosure can be implemented.

As shown in FIG. 1, the example wireless communication system includes a representative base station 12 having an antenna array 14 through which the base station is configured to provide coverage 16 on one or more carriers in one or more frequency bands. Shown operating within coverage of the base station are then a plurality of UEs 18, which could be devices of the type discussed above, among other possibilities.

The base station could be a macro base station of the type configured to provide a wide range of coverage, and the antenna array could be mounted on a tower or other tall structure. Alternatively, the base station could take other forms, such as a small cell base station, a repeater, a femtocell base station, or the like, which might be configured to provide a smaller range of coverage. The base station could be configured to operate according to a 4G, 5G, or other radio access technology. For instance, the base station could be an LTE evolved Node-B (eNB) or a 5GNR gigabit Node-B (gNB), among other possibilities.

The base station is shown coupled with a core network 20, which could be an enhanced packet core (EPC) network, a next generation core (NGC) network, or another network including components supporting an applicable radio access technology and providing connectivity with at least one transport network 22, such as the Internet.

In an example implementation as shown, the core network 20 includes a serving gateway (SGW) 24, a packet data network gateway (PGW) 26, a mobility management entity (MME) 28, a home subscriber server (HSS) 30, and a mobile location system (MLS) 32. In particular, the base station has an interface with the SGW, the SGW has an interface with the PGW, and the PGW provides connectivity with the transport network. Further, the base station has an interface with the MME, and the MME has an interface with the SGW, with the HSS, and with the MLS.

With this arrangement, the SGW and PGW cooperatively provide user-plane connectivity between the base station and the transport network, to enable a UE served by the base station to engage in communication on the transport network. And the MME operates as a controller to carry out operations such as coordinating UE attachment and setup of user-plane bearers. Further, the HSS includes or has access to a data store containing UE capabilities and service profile data and can work with the MME to facilitate UE authentication. And the MLS could operate to determine (e.g., track) geographic location of UEs using techniques such as trilateration, multilateration (e.g., observed time difference of arrival (OTDOA)), satellite-based positioning, or the like.

As discussed above, the air interface between the base station and UEs within its coverage could be structured to define various air interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the base station operates could be divided into subcarriers with specified subcarrier spacing on the order of 15 to 240 kHz. With this arrangement, the air interface on each carrier would define an array of resource elements each occupying a subcarrier and symbol time segment, and the base station and UEs could communicate with each other through modulation of the subcarriers to carry data in those resource elements. Variations of this arrangement are possible as well.

Further, particular groupings of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs.

Further, in certain subframes, a group of resource elements centered on the center frequency of each carrier could be reserved to carry synchronization signals that UEs could detect as a way to discover coverage of the base station on the carrier and to establish frame timing. And in certain subframes, a group of resource elements also centered on the center frequency of the carrier could be reserved to define a broadcast-channel for carrying system information messages, such as master information block (MIB) and system information block (SIB) messages that WCDs could read to obtain operational parameters such as carrier bandwidth and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, still other resources on the uplink could be reserved for other purposes as well, such as for carrying uplink reference signals or the like.

In operation, when a UE enters into coverage of the base station on a carrier, the UE could detect the base station's synchronization signal and could then read the base station's MIB or the like to determine the carrier's bandwidth. The UE could then engage in random access signaling and Radio Resource Control (RRC) configuration signaling with the base station to connect with the base station on the carrier, thus putting the UE in an RRC-connected mode.

Once the UE is connected with the base station, the UE could then transmit to the base station an attach request, which the base station could forward to the MME for processing. And after working with the HSS to authenticate the UE, the MME could coordinate setup for the UE of one or more user-plane bearers between the base station and the PGW, to enable the UE to engage in communication on the transport network. Further, the base station could establish for the UE a context record indicating operational state of the UE, and the base station could receive from the UE and/or the HSS (via the MME) a set of capabilities and profile data for the UE and could store that data in the context record for reference while serving the UE.

The base station could then serve the UE with data communications.

For instance, when data arrives at the base station for transmission to the UE, the base station could allocate one or more downlink PRBs in a subframe for use to transmit at least a portion of the data, defining a transport block, to the UE. The base station could then transmit to the UE in the control region of that subframe a Downlink Control Information (DCI) message that designates the PRBs, and the base station could accordingly transmit the transport block to the UE in those designated PRBs.

And when the UE has data to transmit to the base station (e.g., for transmission on the transport network), the UE could transmit to the base station a scheduling request that carries with it a buffer status report (BSR) indicating how much data the UE has buffered for transmission. And in response the base station, could allocate one or more uplink PRBs in an upcoming subframe for carrying a transport block of that data from the UE and could transmit to the UE a DCI message that designates those upcoming PRBs. The UE could then accordingly transmit the transport block to the base station in the designated PRBs.

While the base station is so serving a connected UE, the UE could also transmit various operational information to the base station to assist with the base station's allocation of PRBs and other service of the UE.

By way of example, the UE could regularly evaluate and report the quality of its coverage from the base station, and the base station could use the UE's reported coverage quality as a basis to configure air interface transmission and/or for other purposes. For instance, the UE could regularly evaluate channel quality based on signal-to-interference-plus-noise ratio (SINR) and could periodically report to the base station a channel-quality-indicator (CQI) value that represents the determined level of quality. And the base station could use the UE's latest reported CQI value as a basis to configure a modulation and coding scheme for use in air interface communication between the base station and the UE. Further, the UE could regularly evaluate and report reference signal receive quality (RSRQ), and the base station could use the reported RSRQ to control UE mobility or for other purposes.

In practice, the base station may serve multiple connected UEs at a time, and the base station may face a need to schedule data transmissions concurrently to multiple such UEs and/or from multiple such UEs. Because the base station's air interface has just a finite, limited number of PRBs per unit time (e.g., per subframe), the base station could implement a scheduling algorithm in an effort to fairly and appropriately allocate the PRBs among the base station's served UEs.

Yet as noted above, the base station may still face load issues. For instance, there could be times when the base station is serving many connected UEs at once and faces a need to schedule data transmissions to many such UEs at once, but the base station does not have sufficient PRBs per unit time to adequately meet the throughput needs of the UEs.

As noted above, the base station could use MIMO to help overcome this problem. In particular, the base station could apply MU-MIMO to facilitate serving multiple UEs at once on the same PRBs as each other and may thereby be able to provide the multiple UEs with a desired level of throughput while also achieving improved spectral efficiency. As further noted above, one way to provide such MIMO service is with use of a massive-MIMO antenna array. Thus, in an example implementation, the base station's antenna array 14 could be a massive-MIMO array.

Figure 2:
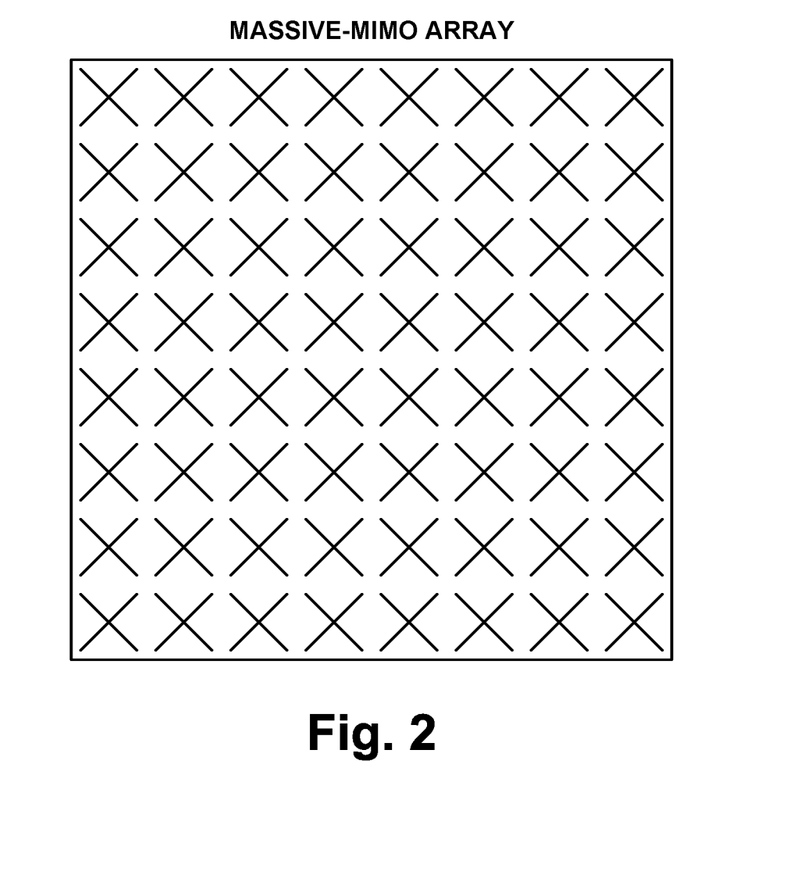
FIG. 2 is a simplified diagram of an example massive-MIMO antenna array that could be implemented according to the disclosure.

FIG. 2 is a simplified diagram of an example massive-MIMO array that could be implemented at base station 12. In this illustration, each X represents two antennas (or antenna elements), one with positive polarization and one with negative polarization. As a result, each column in the example array includes eight antennas with positive polarization and eight antennas with negative polarization. As there are eight columns of antennas, the massive-MIMO array thus has a total of 128 antennas. In a representative implementation, 64 of these antennas could be configured as transmit (downlink) antennas, and the other 64 could be configured as receive (uplink) antennas. For instance, all of the antennas with positive polarization could be configured as transmit antennas, and all of the antennas with negative polarization could be configured as receive antennas.

As discussed above, with this massive-MIMO antenna array, the base station may be able to provide 16 layers of MIMO transmission. For instance, for each layer, the base station could use 4 of its transmit antennas to provide beamformed transmission defining a respective MIMO layer. Thus, the base station could in theory transmit with up to 16 layers on a common set of air interface resources (e.g., PRBs). Other MIMO arrangements are possible as well.

As noted, the base station could transmit individual MIMO layers to UEs, by beamforming and/or pre-coding the transmissions. For example, the base station could beamform transmissions to an individual UE by evaluating angle of arrival of uplink signals (e.g., an uplink sounding-reference-signal) from the UE or determining geolocation of the UE, and setting phase and amplitude of downlink transmission from various antenna elements so as to direct the transmission toward the UE. Further, the base station could pre-code individual transmissions to a UE to help the UE distinguish those transmissions from others and extract the transmissions from a combination of received downlink signals. For instance, the base station could transmit one or more downlink modulation reference signals (DMRSs) that the UE can receive and evaluate in order to establish and report channel estimates, and the base station could use those channel estimates as a basis to pre-code transmissions with weighted coefficients that enable the UE to receive and uncover the transmissions.

Assuming sufficient orthogonality between UEs of a group, the base station could thus transmit to the UEs of the group on the same PRBs as each other, i.e., at the same time and on the same subcarriers as each other. The transmissions to the UEs would occupy the same PRBs as each other, but would be distinguished from each other through beamforming, pre-coding, and/or one or more other mechanisms.

Thus, in each downlink subframe, the base station could allocate a given set of PRBs to each of multiple UEs of a MU-MIMO group and could provide downlink transmission on the allocated PRB(s) respectively to each UE of the MU-MIMO group, using one or more MIMO layers respectively for each UE.

The base station could thus theoretically allocate all of the PRBs of a subframe to the MU-MIMO group, so that each UE of the MU-MIMO group can receive data transmissions on one or more MIMO layers within all of those PRBs. Alternatively, the base station might allocate some of the PRBs of the subframe to a first MU-MIMO group of UEs and transmit to those UEs with MIMO layers on those PRBs, and the base station might allocate other PRBs of the subframe to a second MU-MIMO group of UEs and transmit to those UEs with MIMO layers on those PRBs. Further, the base station might allocate some PRBs of the subframe for use without MIMO or in other ways.

To configure MU-MIMO service for a UE, the base station may engage in signaling with the UE to obtain channel estimates and precoding information, and the base station may work with the UE through DCI signaling to prepare the UE for receipt of beamformed and pre-coded transmissions or the like.

As discussed above, at issue in this process could be which UEs the base station should group together for MU-MIMO service, i.e., to be served with communications on the same air-interface resources (e.g., PRBs) as each other. The base station may face this issue when the base station is heavily loaded, such as with a threshold high number of connected UEs, and when the served UEs could benefit from MU-MIMO service.

In practice, the base station could address this question per downlink subframe. For instance, in anticipation of each downlink subframe, the base station could determine for which of its connected-mode UEs the base station has data buffered for downlink transmission, how soon the data needs to be transmitted, and how many UEs are at issue. Further, the base station could consider its air-interface capacity in the subframe, such as how many PRBs are available for the base station to allocate in the subframe. And based on these and/or other factors, the base station could determine that applying MU-MIMO for transmission in the subframe could be helpful, and the base station could then work to determine which of the UEs the base station should group together for MU-MIMO service.

As noted above, the base station could group UEs together for MU-MIMO service with the grouping being based on the UEs of the group being at least a threshold Euclidian distance from each other.

To facilitate this process, the base station could determine the geographic location (e.g., latitude, longitude, and possibly altitude coordinates) of each of the base station's served UEs or perhaps of a subset of the base station's served UEs such as those having reported threshold high levels of coverage quality. And the base station could compare the determined geographic locations of pairs of the UEs in order to identify UEs that are at least a threshold Euclidian distance from each other.

The base station could determine the geographic location of each of the base station's served UEs in any of a variety of ways.

For example, each UE could determine its own geographic location using satellite-based positioning (e.g., using the Global Positioning System (GPS)) or in another manner and could report its determined location to the base station, perhaps when reporting coverage quality, in which case the base station could determine the UE's geographic location by receiving the UE's report of its geographic location. As another example, the MLS 32 could determine each UE's geographic location and could report the geographic locations to the base station, in which case the base station could determine each UE's geographic location by receiving a report of the location from the MLS. And as still another example, the base station itself could compute each UE's location using trilateration, multilateration, satellite-based positioning, or one or more other techniques. Other examples are possible as well.

The base station could then compare the determined geographic locations of various pairs of UEs to determine for each pair of UEs whether the UEs' geographic locations are at least a threshold Euclidian distance apart. In particular, for each pair of UEs, the base station could compute a geometric difference between the UEs' geographic locations and could compare the difference with a Euclidian-distance threshold.

And if the base station thus determines that the UEs of the pair are located at least the threshold Euclidian distance apart from each other, then based at least on that determination, the base station could determine to group those UEs together for MU-MIMO service. Whereas, if the base station thus determines that the UEs of the pair are not located at least the threshold Euclidian distance apart from each other, then based at least on that determination, the base station could determine to not group those UEs together for MU-MIMO service.

The base station could carry out this process in order to establish a MU-MIMO group of two or more of the base station's served UEs. For a MU-MIMO group of two UEs, at issue would be whether the two UEs are located at least the threshold Euclidian distance from each other. For a MU-MIMO group of three or more UEs, at issue would be whether each UE of the group is located at least the threshold Euclidian distance from each other UE of the group.

As further noted above, the base station could dynamically establish the Euclidian-distance threshold based on the coverage quality of the UEs at issue. For instance, for each pair of UEs whose locations are being compared, the base station could determine which UE has the lower (poorer) reported coverage quality (e.g., per CQI, RSRQ, SINR, and/or one or more other metrics), and the base station could map that lower reported coverage quality to a corresponding Euclidian-distance threshold, based on a mapping that specifies higher Euclidian-distance thresholds for lower reported levels of coverage quality and lower Euclidian-distance thresholds for higher reported levels of coverage quality.

Note also that the base station could consider additional factors when deciding whether to group UEs for MU-MIMO service. For instance, in addition to basing the decision on the Euclidian distance between the UEs, the base station could base the decision on angular separation of the UEs as discussed above. Thus, for each candidate pair of UEs, the base station might determine whether the UEs (i) are located at least the threshold Euclidian distance from each other and (ii) have at least threshold angular separation from each other. If so, then based at least on that determination, the base station could determine to group the UEs together for MU-MIMO service. Whereas, if not, then base at least on that determination, the base station could determine to not group the UEs together for MU-MIMO service. Further, the base station could considerer still other factors as well.

For each of one or more groups of UEs that the base station thereby determines to group together for MU-MIMO service, the base station could then configure MU-MIMO service of the group of UEs. For instance, the base station could engage in signaling with each UE of the group to obtain channel estimates in order to facilitate beamforming and/or precoding of transmissions respectively to each UE. And the base station could cause air-interface transmissions between the base station all UEs of the group to occupy the same time-frequency air interface resources (e.g., the same PRBs and constituent resource elements) as each other. For instance, the base station could transmit respectively to each UE in the group a DCI message that specifies allocated PRBs that will carry data to the UE, and the base station could thereby allocate the same PRBs to each UE in the group.

In contrast, for any UE that the base station decides to not provide with MU-MIMO service, the base station could schedule transmissions between the base station and the UE to occur on different time-frequency air interface resources (e.g., different PRBs) than those that the base station schedules for use with respect to any other served UE.

Figure 3:
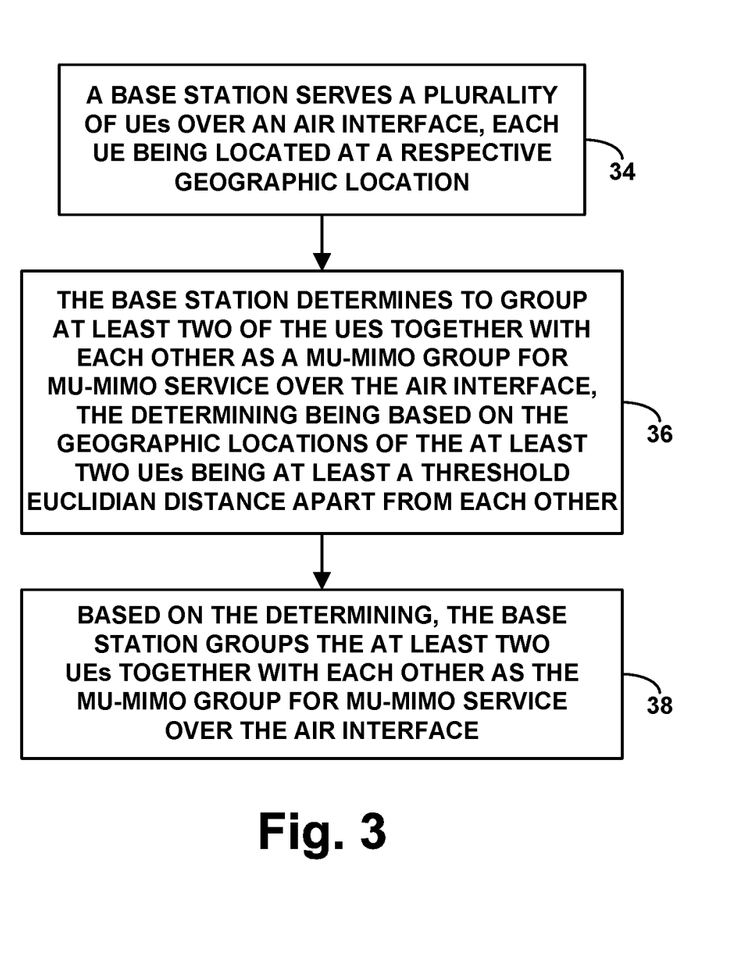
FIG. 3 is a flow chart depicting operations that can be carried out in accordance with the disclosure.

FIG. 3 is a flow chart depicting a method that can be carried out in accordance with this disclosure, to control service over an air interface in a wireless communication system. As shown in FIG. 3, at block 34, the method includes the base station serving a plurality of UEs over the air interface, each UE being located at a respective geographic location (e.g., geographic coordinates within the base station's coverage area). At block 36, the method includes the base station determining to group at least two of the UEs together with each other as a MU-MIMO group for MU-MIMO service over the air interface, the determining being based on the geographic locations of the at least two UEs being at least a threshold Euclidian distance apart from each other. And at block 38, the method includes, based on the determining, the base station grouping the at least two UEs together with each other as the MU-MIMO group for MU-MIMO service over the air interface.

In line with the discussion above, the act of the base station grouping the at least two UEs together with each other as the MU-MIMO group for MU-MIMO service over the air interface could involve the base station configuring air interface transmission between the base station and each UE of the MU-MIMO group to occupy the same time-frequency air interface resources (e.g. PRBs and constituent resource elements) as air interface transmission between the base station and each other UE of the MU-MIMO group.

Further, as discussed above, the act of determining to group the UEs together for MU-MIMO service could be additionally based on a beam direction from the base station to each UE of the at least two UEs being at least threshold different than a beam direction from the base station to each other UE of the at least two UEs. Thus, the base station could (i) make a first determination that the geographic locations of the at least two UEs are at least the threshold Euclidian distance apart from each other, (ii) make a second determination that the beam direction from the base station to each UE of the at least two UEs is at least threshold different than the beam direction from the base station to each other UE of the at least two UEs, and (iii) based at least on a combination of the first determination and the second determination, determine to group the at least two UEs together with each other for MU-MIMO service.

In addition, in line with the discussion above, the act of determining to group the at least two UEs together with each other for MU-MIMO service with the determining being based on the geographic locations of the at least two UEs being at least the threshold Euclidian distance apart from each other could involve (i) determining the geographic location respectively of each UE of the at least two UEs, (ii) comparing the determined geographic location of each UE of the at least two UEs with the determined geographic location of each other UE of the at least two UEs, and (ii) based on the comparing, determining that the geographic location of each UE of the at least two UEs is at least the threshold Euclidian distance apart from the geographic location of each other UE of the at least two UEs.

Still further, as discussed above, the method could include dynamically setting the threshold Euclidian distance based on information regarding coverage quality. For instance, the base station could receive from each UE of the at least two UEs a respective report of quality of coverage from the base station, and the base station could (i) compare the at least two UEs' reported qualities of coverage with each other, (ii) based on the comparing, determine which UE of the at least two UEs has a lowest reported quality of coverage, and (iii) set the threshold Euclidian distance based on the lower reported quality of coverage.

In practice, for instance, the base station could include or have access to mapping data that defines threshold Euclidian distances inversely proportional to qualities of coverage (with longer distance thresholds for lower qualities of coverage, and shorter distance thresholds for higher qualities of coverage). And the base station could refer to that mapping data to determine the threshold Euclidian distance to set based on the determine of the lowest quality of coverage reported by the UEs of the at least two UEs.

Figure 4:
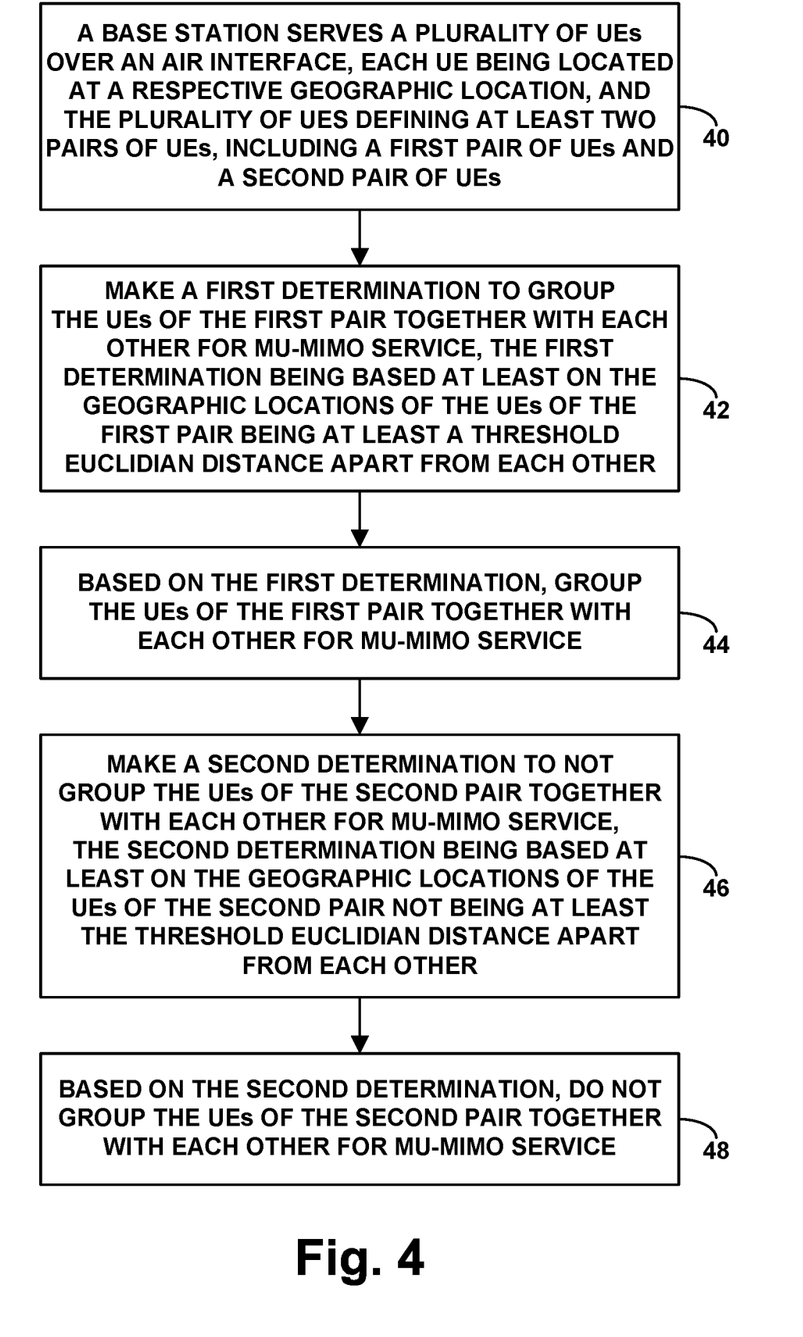
FIG. 4 is another flow chart depicting operations that can be carried out in accordance with the disclosure.

FIG. 4 is another flow chart depicting a method that can be carried out in accordance with this disclosure, to control service over an air interface in a wireless communication system. As shown in FIG. 4, at block 40, the method includes the base station serving a plurality of UEs over the air interface, each UE being located at a respective geographic location, and the plurality of UEs defining at least two pairs of UEs, including a first pair of UEs and a second pair of UEs.

Further, at block 42, the method includes making a first determination to group the UEs of the first pair together with each other for MU-MIMO service, with the first determination being based at least on the geographic locations of the UEs of the first pair being at least a threshold Euclidian distance apart from each other. For instance, making the first determination could involve (i) determining the geographic location respectively of each UE of the first pair, (ii) comparing the determined geographic locations of the UEs of the first pair, and (iii) based on the comparing of the determined geographic locations of the UEs of the first pair, determining that the geographic locations of the UEs of the first pair are at least the threshold Euclidian distance apart from each other.

And at block 44, the method includes, based on the first determination, grouping the UEs of the first pair together with each other for MU-MIMO service. For instance, grouping the UEs of the first pair together with each other for MU-MIMO service could involve configuring air interface transmission between the base station and each UE of the first pair to occupy same time-frequency air interface resources as air interface transmission between the base station and the other UE of the first pair.

In addition, at block 46, the method includes making a second determination (before, in parallel with, or after making the first determination) to not group the UEs of the second pair together with each other for MU-MIMO service, with the second determination being based at least on the geographic locations of the UEs of the second pair not being at least the threshold Euclidian distance apart from each other. For instance, making the second determination could involve (i) determining the geographic location respectively of each UE of the second pair, (ii) comparing the determined geographic locations of the UEs of the second pair, and (iii) based on the comparing of the determined geographic locations of the UEs of the second pair, determining that the geographic locations of the UEs of the second pair are not at least the threshold Euclidian distance apart from each other.

And at block 48, the method includes, based on the second determination, not grouping the UEs of the second pair together with each other for MU-MIMO service (e.g., forgoing from doing so). For instance, not grouping the UEs of the second pair together with each other for MU-MIMO service could involve configuring air interface transmission between the base station and each UE of the second pair to occupy different time-frequency air interface resources than air interface transmission between the base station and the other UE of the second pair.

As further discussed above, the first determination could additionally be based on beam directions from the base station to the UEs of the first pair being threshold angularly separated from each other.

Further, as discussed above, the method could also involve setting the threshold Euclidian distance respectively for each pair of UEs, with the dynamically setting being based on information regarding coverage quality. For instance, the base station could (i) receive from each UE of the pair of UEs a respective report of quality of coverage from the base station, (ii) determine that the quality of coverage reported by one of the UEs of the pair is lower than the quality of coverage reported by the other UE of the pair, and (ii) set the threshold Euclidian distance based on the lower reported quality of coverage—such as based on mapping data that defines threshold Euclidian distances inversely proportional to qualities of coverage.

Figure 5:
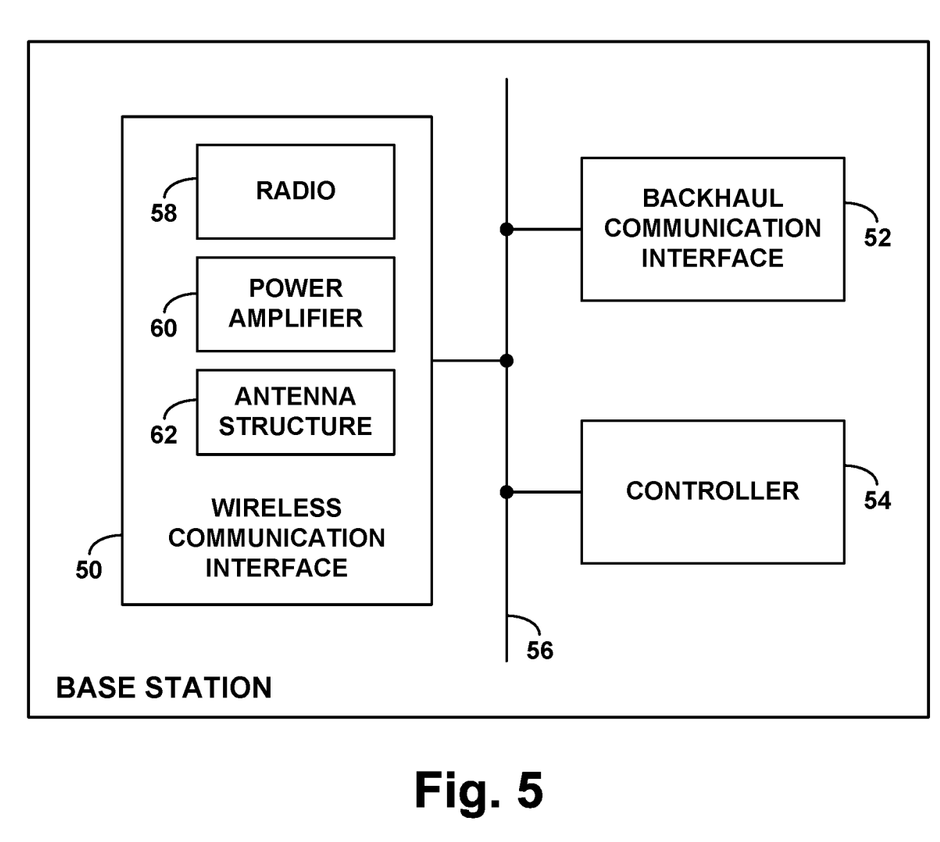
FIG. 5 is a simplified block diagram of a base station operable in accordance with the disclosure.

Finally, FIG. 5 is a simplified block diagram of an example base station that could operate in accordance with the present disclosure, to control service over an air interface in a wireless communication system.

As shown in FIG. 5, the example base station includes a wireless communication interface 50, a backhaul communication interface 52, and a controller 54, which could be integrated together and/or communicatively linked by a network, system bus, or other connection mechanism 56.

Wireless communication interface 50 includes a radio 58, a power amplifier 60, and antenna structure 62. The radio could operate to interface between encoded baseband signals and RF signals. The power amplifier could operate to amplify signals for transmission by the antenna structure 62. And the antenna structure 62 could comprise a plurality of antennas for communicating over the air interface, where the air interface defines physical channel resources for carrying data wirelessly from the base station to a plurality of UEs served by the base station. As discussed above, the antenna structure could comprise an antenna array, such as a massive-MIMO array for instance.

Backhaul communication interface 52 could be a network communication interface (e.g., an Ethernet network interface port and/or connection) through which the base station can communicate with various other network entities.

And controller 54, which could comprise a processing unit, data storage, and program instructions stored in the data storage and executable by the processing unit, or could take other forms, could be operable to cause the base station to carry out various operations as described herein. For example, the controller could be configured to control whether the base station groups at least two of the UEs together with each other as a MU-MIMO group for MU-MIMO service over the air interface, with the controlling being based at least on whether the at least two UEs are located at least a threshold Euclidian distance apart from each other.

In an example implementation, for instance, the controller could (i) determine a geographic location respectively of each UE of the at least two UEs, (ii) compare the determined geographic location of each UE of the at least two UEs with the determined geographic location of each other UE of the at least two UEs, (iii) based on the comparing, make a determination of whether the determined geographic location of each UE of the at least two UEs is at least a threshold Euclidian distance from each other UE of he at least two UEs, (iv) if the determination is affirmative, then cause the base station to group the at least two UEs together with each other for MU-MIMO service and (v) if the determination is negative, then cause the base station to not group the at least two UEs together with each other for MU-MIMO service.

Further, the act of causing the base station to group the at least two UEs together with each other for MU-MIMO service could involve causing the base station to configure air interface transmission between the base station and each UE of the at least two UEs to occupy same time-frequency air interface resources as air interface transmission between the base station and the other UE of the at least two UEs—such as by controlling the base station's scheduling of PRBs. And the act of causing the base station to not group the at least two UEs together with each other for MU-MIMO service could involve causing the base station to configure air interface transmission between the base station and each UE of the at least two UEs to occupy different time-frequency air interface resources than air interface transmission between the base station and the other UE of the at least two UEs (or likewise not causing the base station to configure the air interface transmissions to occupy the same time-frequency resources as each other).

In addition, the controlling could be further based on whether a beam direction from the base station to each UE of the at least two UEs is at least threshold different than a beam direction from the base station to each other UE of the at least two UEs. And the controller could also be configured to dynamically set the threshold Euclidian distance based on information regarding coverage quality.

Other aspects described above could be implemented in this context, and vice versa.

Exemplary embodiments have been described above. Those skilled in the art will understand, however, that changes and modifications may be made to these embodiments without departing from the true scope and spirit of the invention.

We claim:

1. A method for controlling service over an air interface in a wireless communication system, the method comprising:
    serving, by a base station, a plurality of user equipment devices (UEs) over the air interface, wherein each UE is located at a respective geographic location;
    determining by the base station to group at least two of the UEs together with each other as a Multi-User Multiple-Input-Multiple-Output (MU-MIMO) group for MU-MIMO service over the air interface, wherein the determining is based on the geographic locations of the at least two UEs being at least a threshold Euclidian distance apart from each other and additionally on a beam direction from the base station to each UE of the at least two UEs being at least threshold different than a beam direction from the base station to each other UE of the at least two UEs; and
    based on the determining, grouping by the base station the at least two UEs together with each other as the MU-MIMO group for MU-MIMO service over the air interface,
    wherein determining to group the at least two UEs together with each other for MU-MIMO service with the determining being based on the geographic locations of the at least two UEs being at least the threshold Euclidian distance apart from each other and additionally on the beam direction from the base station to each UE of the at least two UEs being at least threshold different than the beam direction from the base station to each other UE of the at least two UEs comprises (i) making a first determination that the geographic locations of the at least two UEs are at least the threshold Euclidian distance apart from each other, (ii) making a second determination that the beam direction from the base station to each UE of the at least two UEs is at least threshold different than the beam direction from the base station to each other UE of the at least two UEs, and (iii) based at least on a combination of the first determination and the second determination, determining to group the at least two UEs together with each other for MU-MIMO service.

2. The method of claim 1, wherein grouping by the base station the at least two UEs together with each other as the MU-MIMO group for MU-MIMO service over the air interface comprises configuring by the base station air interface transmission between the base station and each UE of the MU-MIMO group to occupy same time-frequency air interface resources as air interface transmission between the base station and each other UE of the MU-MIMO group.

3. The method of claim 1, wherein determining to group the at least two UEs together with each other for MU-MIMO service with the determining being based on the geographic locations of the at least two UEs being at least the threshold Euclidian distance apart from each other comprises:
    determining the geographic location respectively of each UE of the at least two UEs;
    comparing the determined geographic location of each UE of the at least two UEs with the determined geographic location of each other UE of the at least two UEs; and
    based on the comparing, determining that the geographic location of each UE of the at least two UEs is at least the threshold Euclidian distance apart from the geographic location of each other UE of the at least two UEs.

4. The method of claim 1, further comprising dynamically setting the threshold Euclidian distance based on information regarding coverage quality.

5. The method of claim 4, wherein dynamically setting the threshold Euclidian distance based on information regarding coverage quality comprises:
    receiving by the base station from each UE of the at least two UEs a respective report of quality of coverage from the base station;
    corn paring the at least two UEs' reported qualities of coverage with each other;
    based on the comparing, determining which UE of the at least two UEs has a lower reported quality of coverage; and
    setting the threshold Euclidian distance based on the lower reported quality of coverage.

6. The method of claim 5, wherein setting the threshold Euclidian distance based on the lower reported quality of coverage is based on mapping data that defines threshold Euclidian distances inversely proportional to qualities of coverage.

7. A method for controlling service over an air interface in a wireless communication system, the method comprising:

serving, by a base station, a plurality of user equipment devices (UEs) over the air interface, wherein each UE is located at a respective geographic location, and wherein the plurality of UEs defines at least two pairs of UEs, including a first pair of UEs and a second pair of UEs;

making a first determination to group the UEs of the first pair together with each other for Multi-User Multiple-Input-Multiple-Output (MU-MIMO) service, with the first determination being based at least on the geographic locations of the UEs of the first pair being at least a threshold Euclidian distance apart from each other, wherein making the first determination comprises (i) determining the geographic location respectively of each UE of the first pair, (ii) comparing the determined geographic locations of the UEs of the first pair, and (iii) based on the comparing of the determined geographic locations of the UEs of the first pair, determining that the geographic locations of the UEs of the first pair are at least the threshold Euclidian distance apart from each other;

based on the first determination, grouping the UEs of the first pair together with each other for MU-MIMO service;

making a second determination to not group the UEs of the second pair together with each other for MU-MIMO service, with the second determination being based at least on the geographic locations of the UEs of the second pair not being at least the threshold Euclidian distance apart from each other, wherein making the second determination comprises (i) determining the geographic location respectively of each UE of the second pair, (ii) comparing the determined geographic locations of the UEs of the second pair, and (iii) based on the comparing of the determined geographic locations of the UEs of the second pair, determining that the geographic locations of the UEs of the second pair are not at least the threshold Euclidian distance apart from each other; and based on the second determination, not grouping the UEs of the second pair together with each other for MU-MIMO service.

8. The method of claim 7,
wherein grouping the UEs of the first pair together with each other for MU-MIMO service comprises configuring air interface transmission between the base station and each UE of the first pair to occupy same time-frequency air interface resources as air interface transmission between the base station and the other UE of the first pair, and
wherein not grouping the UEs of the second pair together with each other for MU-MIMO service comprises configuring air interface transmission between the base station and each UE of the second pair to occupy different time-frequency air interface resources than air interface transmission between the base station and the other UE of the second pair.

9. The method of claim 7, wherein the first determination is additionally based on beam directions from the base station to the UEs of the first pair being threshold angularly separated from each other.

10. The method of claim 7, dynamically setting the threshold Euclidian distance respectively for each pair of UEs, with the dynamically setting being based on information regarding coverage quality.

11. The method of claim 10, wherein dynamically setting the threshold Euclidian distance for each pair of UEs based on information regarding coverage quality comprises:
receiving by the base station from each UE of the pair of UEs a respective report of quality of coverage from the base station;
determining that the quality of coverage reported by one of the UEs of the pair is lower than the quality of coverage reported by the other UE of the pair;
setting the threshold Euclidian distance based on the lower reported quality of coverage.

12. The method of claim 11, wherein setting the threshold Euclidian distance based on the lower reported quality of coverage is based on mapping data that defines threshold Euclidian distances inversely proportional to qualities of coverage.

13. A base station operable in a wireless communication system to control service over an air interface, the base station comprising:
an antenna structure comprising a plurality of antennas for communicating over the air interface, wherein the air interface defines physical channel resources for carrying data wirelessly from the base station to a plurality of user equipment devices (UEs) served by the base station; and
a controller for scheduling use of the physical channel resources to carry data wirelessly from the base station to the UEs,
wherein the controller is configured to control whether the base station groups at least two of the UEs together with each other as a Multi-User Multiple-Input-Multiple-Output (MU-MIMO) group for MU-MIMO service over the air interface, with the controlling being based at least on whether the at least two UEs are located at least a threshold Euclidian distance apart from each other, and
wherein the controller is configured to dynamically set the threshold Euclidian distance based on information regarding coverage quality, including (i) receiving from each UE of the at least two UEs a respective report of quality of coverage from the base station, (ii) comparing the at least two UEs' reported qualities of coverage with each other, (iii) based on the comparing, determining which UE of the at least two UEs has a lower reported quality of coverage, and (iv) setting the threshold Euclidian distance based on the lower reported quality of coverage.

14. The base station of claim 13, wherein controlling whether the base station groups the at least two UEs together with each other for MU-MIMO service with the controlling being based at least on whether the at least two UEs are located at least a threshold Euclidian distance apart from each other comprises:
determining a geographic location respectively of each UE of the at least two UEs;
comparing the determined geographic location of each UE of the at least two UEs with the determined geographic location of each other UE of the at least two UEs;
based on the comparing, making a determination of whether the determined geographic location of each UE of the at least two UEs is at least a threshold Euclidian distance from each other UE of the at least two UEs;
if the determination is affirmative, then causing the base station to group the at least two UEs together with each other for MU-MIMO service; and if the determination is negative, then causing the base station to not group the at least two UEs together with each other for MU-MIMO service.

15. The base station of claim 14,
wherein causing the base station to group the at least two UEs together with each other for MU-MIMO service comprises causing the base station to configure air interface transmission between the base station and each UE of the at least two UEs to occupy same time-frequency air interface resources as air interface transmission between the base station and the other UE of the at least two UEs, and
wherein causing the base station to not group the at least two UEs together with each other for MU-MIMO service comprises causing the base station to configure air interface transmission between the base station and each UE of the at least two UEs to occupy different time-frequency air interface resources than air interface transmission between the base station and the other UE of the at least two UEs.

16. The base station of claim 13, wherein the controlling is further based on whether a beam direction from the base station to each UE of the at least two UEs is at least threshold different than a beam direction from the base station to each other UE of the at least two UEs.

17. The base station of claim 13, wherein setting the threshold Euclidian distance based on the lower reported quality of coverage is based on mapping data that defines threshold Euclidian distances inversely proportional to qualities of coverage.

18. The base station of claim 13, wherein grouping the at least two UEs together with each other as the MU-MIMO group for MU-MIMO service over the air interface comprises configuring air interface transmission between the base station and each UE of the MU-MIMO group to occupy same time-frequency air interface resources as air interface transmission between the base station and each other UE of the MU-MIMO group.

\* \* \* \* \*